United States Patent
Liu

(10) Patent No.: US 10,564,474 B2
(45) Date of Patent: Feb. 18, 2020

(54) LIQUID CRYSTAL DISPLAY PANEL AND LIQUID CRYSTAL DISPLAY DEVICE

(71) Applicant: Shenzhen China Star Optoelectronics Technology Co., Ltd., Shenzhen (CN)

(72) Inventor: Guohe Liu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 174 days.

(21) Appl. No.: 14/897,520

(22) PCT Filed: Sep. 9, 2015

(86) PCT No.: PCT/CN2015/089211
§ 371 (c)(1),
(2) Date: Jan. 30, 2018

(87) PCT Pub. No.: WO2017/031789
PCT Pub. Date: Mar. 2, 2017

(65) Prior Publication Data
US 2018/0157122 A1   Jun. 7, 2018

(30) Foreign Application Priority Data
Aug. 27, 2015   (CN) .......................... 2015 1 0536386

(51) Int. Cl.
*G02F 1/1335*   (2006.01)
*G02F 1/1362*   (2006.01)

(52) U.S. Cl.
CPC .. *G02F 1/133617* (2013.01); *G02F 1/133512* (2013.01); *G02F 1/133528* (2013.01);
(Continued)

(58) Field of Classification Search
CPC ......... G02F 1/133617; G02F 1/133512; G02F 1/133528
See application file for complete search history.

(56) References Cited

U.S. PATENT DOCUMENTS

| | | | | |
|---|---|---|---|---|
| 6,124,907 | A | * | 9/2000 | Jones ................... G02B 5/3033 349/106 |
| 2004/0179160 | A1 | * | 9/2004 | Rhee ..................... G02F 1/1362 349/139 |

(Continued)

FOREIGN PATENT DOCUMENTS

| CN | 103412435 A | 11/2013 |
|---|---|---|
| CN | 104330918 A | 2/2015 |

(Continued)

OTHER PUBLICATIONS

Notification of Transmittal of the International Search Report and the Written Opinion of the International Searching Authority (Forms PCT/ISA/210, PCT/ISA/220, and PCT/ISA/237) dated May 25, 2016, by the State Intellectual Property Office of People's Republic of China in corresponding International Application No. PCT/CN2015/089211. (13 pages).

(Continued)

*Primary Examiner* — Lucy P Chien

(57) ABSTRACT

Disclosed is a liquid crystal display panel and a liquid crystal display device. The liquid crystal display panel comprises a first substrate and a second substrate which are disposed opposite to each other. The first substrate is provided, on a side thereof facing the second substrate, with a first polarizer film. The second substrate is provided thereon with a second polarizer film. A quantum-dot layer is provided between the first polarizer film and the first substrate, so that light can first pass through the quantum-dot layer and excite the quantum-dot layer, then enter the first polarizer film, and finally shine out through the second polarizer film. The (Continued)

liquid crystal display panel provided by the present disclosure will exhibit better display effect and have a higher transmissivity.

16 Claims, 2 Drawing Sheets

(52) U.S. Cl.
CPC ............ *G02F 2001/133565* (2013.01); *G02F 2001/136222* (2013.01); *G02F 2201/48* (2013.01); *G02F 2201/50* (2013.01)

(56) References Cited

U.S. PATENT DOCUMENTS

| | | | |
|---|---|---|---|
| 2012/0056130 A1* | 3/2012 | Zhou | ................ C09K 11/7775 |
| | | | 252/301.4 F |
| 2014/0204128 A1 | 7/2014 | Jiang | |
| 2015/0109560 A1 | 4/2015 | Guo et al. | |
| 2015/0331278 A1* | 11/2015 | Araki | ................ G02F 1/133617 |
| | | | 349/61 |
| 2016/0033816 A1* | 2/2016 | Yoon | ................ G02F 1/133512 |
| | | | 349/108 |
| 2016/0147101 A1 | 5/2016 | Saneto et al. | |
| 2016/0178966 A1 | 6/2016 | Li et al. | |
| 2016/0357068 A1 | 12/2016 | Yang et al. | |

FOREIGN PATENT DOCUMENTS

| | | |
|---|---|---|
| CN | 104360536 A | 2/2015 |
| CN | 104360540 A | 2/2015 |
| CN | 104516039 A | 4/2015 |
| CN | 104765187 A | 7/2015 |
| WO | 2015/012260 A1 | 1/2015 |

OTHER PUBLICATIONS

Office Action dated Oct. 26, 2017, by the State Intellectual Property Office of People's Republic of China in corresponding Chinese Patent Application No. 201510536386.2 (7 pages).

* cited by examiner

LIQUID CRYSTAL DISPLAY PANEL AND LIQUID CRYSTAL DISPLAY DEVICE

CROSS-REFERENCE TO RELATED APPLICATIONS

The present application claims the priority of Chinese patent application CN201510536386.2, entitled "Liquid crystal display panel and liquid crystal display device" and filed on Aug. 27, 2015, the entirety of which is incorporated herein by reference.

TECHNICAL FIELD

The present disclosure relates to the technical field of liquid crystal display, and in particular, to a liquid crystal display panel and a liquid crystal display device.

TECHNICAL BACKGROUND

Quantum dots are semi-conductor nanoparticles made up of group II-VI elements or group III-V elements and with sizes ranging from several nanometers to tens of nanometers. Quantum confinement effect can be observed in quantum-dot materials. Specifically, the electrons and electron holes within a quantum dot material can be squeezed into a dimension that approaches a critical quantum measurement, which enables the original continuous energy band to become discrete energy levels, whereby the material can emit visible light in response to an external excitation. The emission peak of a quantum-dot material has a relatively small half width at half maximum, and the color of light emitted by the quantum-dot material can be tuned by changing the size, structure, and/or composition of the quantum dot. Therefore, use of a quantum-dot material in a liquid crystal display panel can effectively improve color saturation and extend color gamut of the liquid crystal display panel.

In view of the above-mentioned advantages of quantum dots, in the existing technologies, quantum dots are incorporated into a color filter of a liquid crystal display panel so as to improve the color performance of the display panel. However, in these display panels provided by the existing technologies, effects of quantum dots on the polarization state of light are ignored. Backlight or natural light becomes linearly polarized light after passing through a polarizer. When excited by said linearly polarized light, a quantum-dot material will emit elliptically polarized light rather than the original linearly polarized light. After passing through a polarization analyzer, said elliptically polarized light will have a distinctly reduced transmittance, thus enabling the display panel to fail to display normally.

Furthermore, in an existing liquid crystal display panel using quantum dots, the backlight source is usually a blue-light backlight source. In case of insufficient absorption of the blue backlight by a quantum-dot layer, a blue-light filtering layer is provided, which can greatly decrease the transmissivity of the display panel.

In addition, the existing liquid crystal display devices also fail to consider effects of an excitation from outside surroundings on a quantum-dot layer.

In view of the foregoing technical problems, the present disclosure aims to provide a liquid crystal display device capable of producing better color effect and having a relatively higher transmissivity.

SUMMARY OF THE INVENTION

Directed against the defects of the existing technologies, the present disclosure provides a liquid crystal display panel and a liquid crystal display device.

The liquid crystal display panel provided by the present disclosure comprises a first substrate and a second substrate which are disposed opposite to each other. The first substrate is provided, on a side thereof facing the second substrate, with a first polarizer film, and the second substrate is provided thereon with a second polarizer film. A quantum-dot layer is provided between the first polarizer film and the first substrate, so that light can first pass through the quantum-dot layer and excite the quantum-dot layer, then enter the first polarizer film, and finally shine out through the second polarizer film.

According to the liquid crystal display panel provided by the present disclosure, by providing the quantum-dot layer, color performance of the liquid crystal display panel may be enhanced. Besides, by providing the quantum-dot layer between the first polarizer film and the first substrate, the light emitted by a backlight source can be caused to first pass through the quantum-dot layer and excite the quantum-dot layer, then enter the first polarizer film, and finally shine out through the second polarizer film. Such arrangement, on the one hand, prevents effects of the quantum-dot layer on polarization state of the light, and on the other hand, enables outside light incoming from the second substrate to pass through the second polarizer film and the first polarizer film with polarization orientations perpendicular to each other, thus rendering it impossible for the incoming outside light to reach the quantum-dot layer on the first substrate. In this way, the quantum-dot layer will be protected from outside light and thus will not emit light due to an excitation from the outside light. That is, this arrangement prevents effects of outside light on the quantum-dot layer.

In one embodiment, the quantum-dot layer comprises a red quantum-dot unit, a green quantum-dot unit, a transparent unit, and a white sub-pixel unit, which are arranged in sequence. The red quantum-dot unit, the green quantum-dot unit, and the white sub-pixel unit each are provided therein with quantum dots that are capable of producing a corresponding color light after being excited by a blue light. The transparent unit is used for direct passing through of the blue light. The quantum-dot layer provided in this solution adopts a four-pixel design. That is, quantum-dot layer uses four types of pixels, namely the red quantum-dot unit, the green quantum-dot unit, the transparent unit, and the white sub-pixel unit, wherein the white sub-pixel unit is used to further improve the aperture ratio of the liquid crystal display panel. In this manner, the liquid crystal display panel will have an improved transmissivity and brightness.

In one embodiment, the quantum dots in the red quantum-dot unit and in the green quantum-dot unit each are one or more types of quantum dots selected from II-VI or III-V quantum dots, and the white sub-pixel unit is made of cerium fluorescent powder. In this technical solution, the quantum dots in the red quantum-dot unit and the green quantum-dot unit can respectively be a mixture of II-VI or III-V quantum-dot materials with different sizes. Proportioning of these quantum dots is dependent on specific requirement for light.

In one embodiment, the quantum dots in the quantum-dot layer are distributed uniformly in the quantum-dot layer. This can enable the light passed through the quantum-dot layer to shine out more uniformly, thus enabling the liquid crystal display panel to have a better display quality.

In one embodiment, a transparent protective layer is formed between the quantum-dot layer and the first polarizer film. The transparent protective layer, on the one hand, enables the quantum-dot layer to be flatter so as to facilitate subsequent arrangement of the first polarizer film, and on the other hand, protects the quantum-dot layer from damage so as to avoid effect on the display quality of the liquid crystal display panel. Preferably, the transparent unit is formed from the transparent protective layer, by means of which a process of forming the transparent unit can be saved, thereby simplifying the whole process of manufacturing the liquid crystal display panel.

In one embodiment, the first polarizer film is provided, on a side thereof facing the second substrate, with a first alignment film, and the second substrate is provided, on a side thereof facing the first alignment film, with a second alignment film. The first alignment film and the second alignment film are used for controlling arrangement direction and tilt angle of liquid crystal molecules.

In one embodiment, a black matrix layer is provided between the second alignment film and the second substrate, and the second polarizer film is provided between the black matrix layer and the second alignment film. In this solution, the second polarizer film is provided within the liquid crystal display panel, and thus can be protected from damage caused by an external force exerted thereupon.

In one embodiment, the second polarizer film is provided on a side of the second substrate away from the first substrate. Such arrangement may facilitate arrangement of the second polarizer film and manufacture of the liquid crystal display panel.

A liquid crystal display device provided by the present disclosure comprises the above liquid crystal display, and a blue-light backlight module provided on a side of the first substrate.

The liquid crystal display device using the above liquid crystal display panel may have a better color display. Besides, the liquid crystal display device can, on the one hand, prevent effects of the quantum-dot layer on the polarization state of the light, and on the other hand, protect the quantum-dot layer from outside light. In addition, the pixel unit of the liquid crystal display device provided by the present disclosure adopts a four-pixel design, which can greatly improve the transmissivity of the liquid crystal display device, thus improving the brightness of the liquid crystal display device.

Compared with the existing technologies, the present disclosure can achieve the following beneficial effects. (1) The liquid crystal display panel provided by the present disclosure may prevent effects of the quantum-dot layer on the polarization state of the light. (2) The quantum-dot layer in the liquid crystal display panel provided by the present disclosure is protected from outside light and thus cannot emit light due to an excitation from outside light. Thus, outside light will have no effect on the quantum-dot layer. (3) The pixel unit of the liquid crystal display panel provided by the present disclosure adopts a four-pixel design, which can greatly improve the transmissivity of the liquid crystal display panel, thus improving the brightness of the liquid crystal display panel.

BRIEF DESCRIPTION OF THE DRAWINGS

The present disclosure will be described further in detail below based on the embodiments and by reference to the accompanying drawings.

Figure 1:
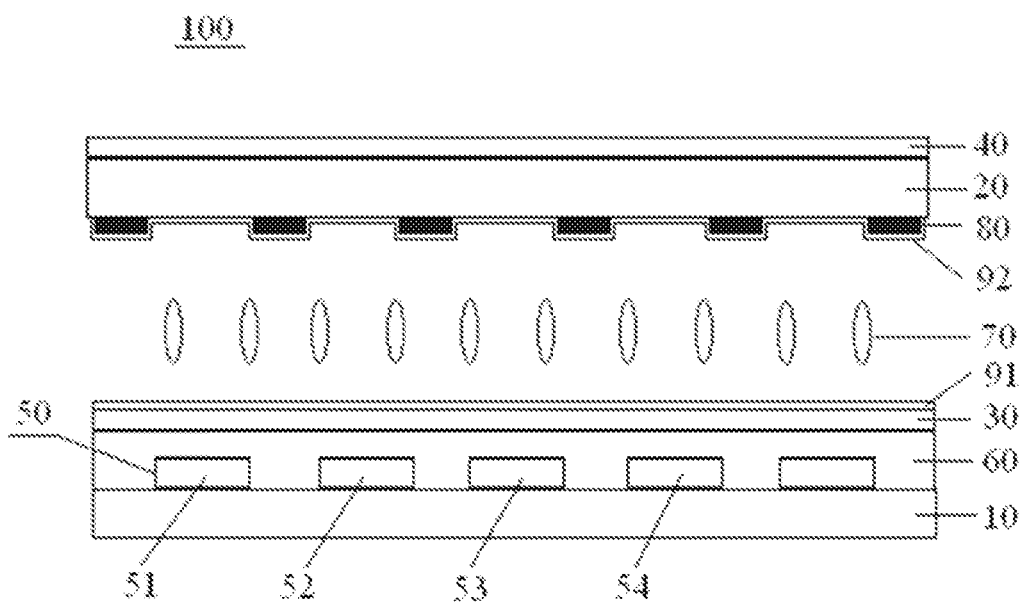
FIG. 1 schematically shows the structure of a liquid crystal display panel according to one embodiment of the present disclosure.

In the drawings, same components are indicated with a same reference sign. The drawings are not drawn to scale.

DETAILED DESCRIPTION OF THE EMBODIMENTS

The present disclosure will be further explained in detail by reference to the accompanying drawings.

The details provided herein are merely exemplary in nature, and serve only as examples in discussing the embodiments of the present disclosure, as well as the most useful and comprehensible description about the present disclosure with respect to the principle and concepts thereof. These descriptions are provided only for basic understanding of the present application. One skilled in the art can clearly understand, based on the description and the accompanying drawings, how to implement the present disclosure in different ways.

FIG. 1 schematically shows the structure of a liquid crystal display panel 100 provided by the present disclosure. As shown in FIG. 1, the liquid crystal display panel 100 comprises a first substrate 10 and a second substrate 20 which are disposed opposite to each other. The first substrate 10 is provided, on a side thereof facing the second substrate 20, with a first polarizer film 30. The second substrate 20 is provided thereon with a second polarizer film 40. The first polarizer film 30 and the first substrate 10 are provided therebetween with a quantum-dot layer 50, so that light can first pass through the quantum-dot layer 50 and excite the quantum-dot layer 50, then enter the first polarizer film 30, and finally shine out through the second polarizer film 40.

According the liquid crystal display panel 100 provided by the present disclosure, by providing the quantum-dot layer 50, image color of the liquid crystal display panel can be enhanced. Besides, by providing the quantum-dot layer 50 between the first polarizer film 30 and the first substrate 10, the light emitted by a backlight source can be caused to first pass through the quantum-dot layer 50 and excite the quantum-dot layer 50, then enter the first polarizer film 30, and finally shine out through the second polarizer film 40. Such arrangement, on the one hand, prevents effects of the quantum-dot layer 50 on polarization state of the light, and on the other hand, enables outside light incoming from the second substrate 20 to pass through the second polarizer film 40 and the first polarizer film 30 with polarization orientations perpendicular to each other, thus rendering it impossible for the incoming outside light to reach the quantum-dot layer 50 on the first substrate 10. In this way, the quantum-dot layer 50 will be protected from outside light and thus will not emit light due to an excitation from the outside light. That is, this arrangement prevents effects of outside light on the quantum-dot layer 50.

According to the present disclosure, as shown in FIG. 1, the quantum-dot layer 50 comprises a red quantum-dot unit 51, a green quantum-dot unit 52, a transparent unit 53, and a white sub-pixel unit 54, which are arranged in sequence. The red quantum-dot unit 51, the green quantum-dot unit 52, and the white pixel unit 54 each are provided therein with quantum dots that are capable of producing a corresponding color light after being excited by a blue light. The transparent unit 53 is provided for direct passing through of the blue light. According to this technical solution, when the blue light passes through the quantum-dot layer 50 on the first substrate 10, the quantum dots in the red quantum-dot unit 51 and in the green quantum-dot unit 52 will be excited and will emit red light and green light respectively, and the white sub-pixel unit 54 will be excited and will emit white light. The blue light passes directly through the transparent unit 53. The quantum-dot layer 50 provided in this solution adopts a four-pixel design. That is, quantum-dot layer 50 uses four types of pixels, namely the red quantum-dot unit 51, the green quantum-dot unit 52, the transparent unit 53, and the white sub-pixel unit 54, wherein the white sub-pixel unit 54 is used to further improve the aperture ratio of the liquid crystal display panel 100.

In this manner, the liquid crystal display panel 100 will have an improved transmissivity and brightness. The transparent unit 53 can be made of a transparent resin material.

Preferably, the quantum dots in the red quantum-dot unit 51 and the green quantum-dot unit 52 each are one or more types of quantum dots selected from II-VI or III-V quantum dots. The white sub-pixel unit 54 is made of cerium fluorescent powder. In this technical solution, the quantum dots in the red quantum-dot unit 51 and the green quantum-dot unit 52 can respectively be a mixture of II-VI or III-V quantum-dot materials with different sizes. Proportioning of these quantum dots is dependent on specific requirement for light. The red quantum-dot unit 51 and the green quantum-dot unit 52 can be formed by photolithography process after selected quantum dots are mixed with a photoresist. The white sub-pixel unit 54 can be formed after cerium fluorescent powder is mixed with the photoresist.

Further preferably, the quantum dots in the quantum-dot layer 50 are distributed uniformly in the quantum-dot layer. This can enable the light passed through the quantum-dot layer 50 to shine out more uniformly, thus enabling the liquid crystal display panel 100 to have a better display quality.

According to the present disclosure, as shown in FIG. 1, a transparent protective layer 60 is formed between the quantum-dot layer 50 and the first polarizer film 30. The transparent protective layer 60, on the one hand, enables the quantum-dot layer 50 to be flatter so as to facilitate subsequent arrangement of the first polarizer film 30, and on the other, protects the quantum-dot layer 50 from damage so as to avoid effect on the display quality of the liquid crystal display panel 100. Preferably, the transparent unit 53 is formed from the transparent protective layer 60, by means of which a process of forming the transparent unit 53 can be saved, thereby simplifying the whole process of manufacturing the liquid crystal display panel 100.

According to the present disclosure, the first polarizer film 30 is provided, on a side thereof facing the second substrate 20, with a first alignment film 91, and the second substrate 20 is provided, on a side thereof facing the first alignment film 91, with a second alignment film 92. The first alignment film 91 and the second alignment film 92 are used for controlling arrangement direction and tilt angle of liquid crystal molecules 70.

In an embodiment as shown in FIG. 1, the second polarizer film 40 is provided on a side of the second substrate 20 away from the first substrate 10. Such arrangement may facilitate arrangement of the second polarizer film 40 and manufacture of the liquid crystal display panel 100. A black matrix layer 80 and the second alignment film 82 are provided on a side of the second substrate 20 close to the first alignment film 91.

Figure 2:
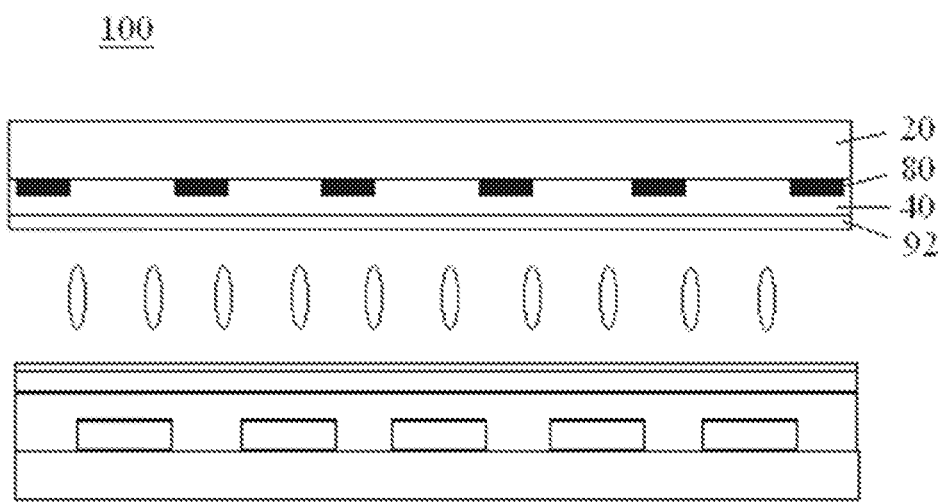
FIG. 2 schematically shows the structure of the liquid crystal display panel according to another embodiment of the present disclosure.

In an embodiment as shown in FIG. 2, different from the embodiment as shown in FIG. 1, the black matrix layer 80 is provided between the second alignment film 92 and the second substrate 20, and the second polarizer film 40 is provided between the black matrix layer 80 and the second alignment film 40. By providing the second polarizer film 40 within the liquid crystal display panel 100, the second polarizer film 40 will be protected from damage caused by an external force exerted thereon.

Figure 3:
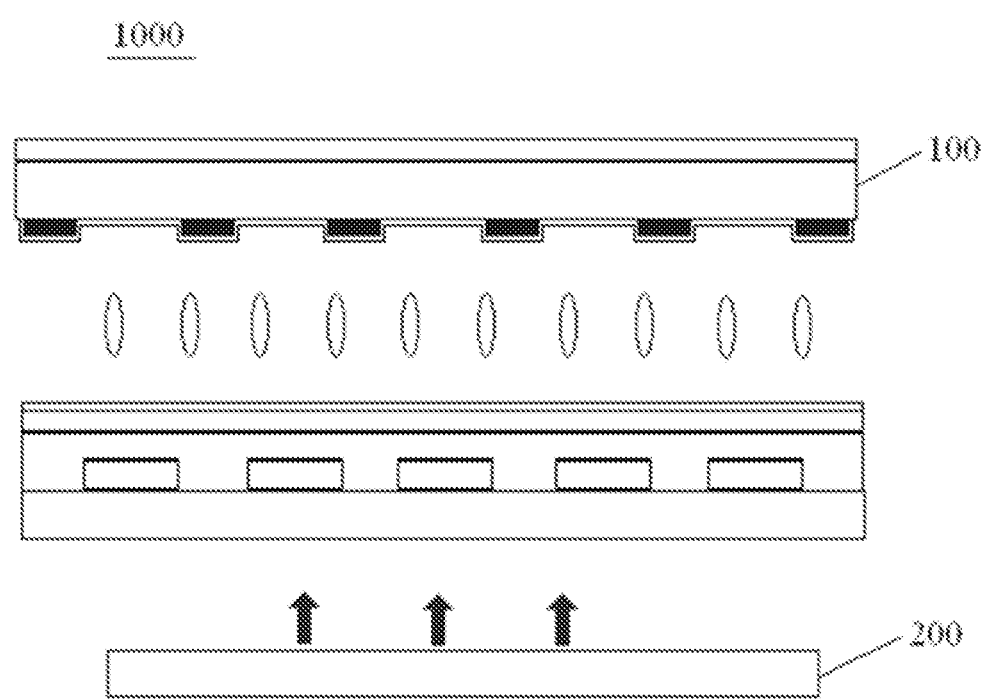
FIG. 3 schematically shows the structure of a liquid crystal display device according to the present disclosure.

FIG. 3 schematically shows the structure of a liquid crystal display device 1000 provided by the present disclosure. The liquid crystal display device 1000 comprises the above liquid crystal display panel 100, and a blue-light backlight module 200 provided on a side of the first substrate 10.

The liquid crystal display device 1000 using the above liquid crystal display panel 100 may have a better color display. Besides, the liquid crystal display device 1000 can, on the one hand, prevent effects of the quantum-dot layer 50 on the polarization state of the light, and on the other hand, protect the quantum-dot layer 50 from outside light. In addition, the pixel unit of the liquid crystal display device 1000 provided by the present disclosure adopts a four-pixel design, which can greatly improve the transmissivity of the liquid crystal display device 1000, thus improving the brightness of the liquid crystal display device 1000.

It should be noted that the above embodiments are described only for better understanding, rather than restricting the present disclosure, and that the language used herein are descriptive and illustrative, rather than prescriptive. Anyone skilled in the art can make amendments to the present disclosure without departing from the spirit and scope of the present disclosure. Although the present disclosure has been described herein with regard to particular implementing forms, materials, and embodiments, it is not limited to the details disclosed herein, but can incorporate the structures, methods and applications equivalent to those claimed by the claims of the present disclosure.

The invention claimed is:

1. A liquid crystal display panel, comprising a first substrate and a second substrate which are disposed opposite to each other, the first substrate being provided, on a side thereof facing the second substrate, with a first polarizer film, and the second substrate being provided thereon with a second polarizer film,
   wherein a quantum-dot layer is provided between the first polarizer film and the first substrate, so that light can first pass through the quantum-dot layer and excite the quantum-dot layer, then enter the first polarizer film, and finally shine out through the second polarizer film;
   wherein the quantum-dot layer comprises a red quantum-dot unit, a green quantum-dot unit, a transparent unit, and a white sub-pixel unit, which are arranged in sequence, and
   wherein the red quantum-dot unit, the green quantum-dot unit, and the white sub-pixel unit each are provided therein with quantum dots that are capable of producing a corresponding color light after being excited by a blue light, and the transparent unit is used for direct passing through of the blue light.

2. The liquid crystal display panel according to claim 1, wherein the quantum dots in the red quantum-dot unit and in the green quantum-dot unit each are one or more types of quantum dots selected from II-VI or III-V quantum dots, and the white sub-pixel unit is made of cerium fluorescent powder.

3. The liquid crystal display panel according to claim 1, wherein the quantum dots in the quantum-dot layer are distributed uniformly in the quantum-dot layer.

4. The liquid crystal display panel according to claim 2, wherein the quantum dots in the quantum-dot layer are distributed uniformly in the quantum-dot layer.

5. The liquid crystal display panel according to claim 1, wherein a transparent protective layer s formed between the quantum-dot layer and the first polarizer film.

6. The liquid crystal display panel according to claim 2, wherein a transparent protective layer is formed between the quantum-dot layer and the first polarizer film.

7. The liquid crystal display panel according to claim 5, wherein the transparent unit is formed from the transparent protective layer.

8. The liquid crystal display panel according to claim 6, wherein the transparent unit is formed from the transparent protective layer.

9. The liquid crystal display panel according to claim 1, wherein the first polarizer film is provided, on a side thereof facing the second substrate, with a first alignment film, and the second substrate is provided, on a side thereof facing the first alignment film, with a second alignment film.

10. The liquid crystal display panel according to claim 9, wherein a black matrix layer is provided between the second alignment film and the second substrate, and the second polarizer film is provided between the black matrix layer and the second alignment film.

11. The liquid crystal display panel according to claim 1, wherein the second polarizer film is provided on a side of the second substrate away from the first substrate.

12. A liquid crystal display device, comprising a liquid crystal display panel and a blue-light backlight module,
wherein the liquid crystal display panel comprises a first substrate and a second substrate which are disposed opposite to each other, the first substrate being provided, on a side thereof facing the second substrate, with a first polarizer film, and the second substrate being provided thereon with a second polarizer film, and
wherein a quantum-dot layer is provided between the first substrate and the second substrate, so that light can first pass through the quantum-dot layer and excite the quantum-dot layer, then enter the first polarizer film, and finally shine out through the second polarizer film;
wherein the quantum-dot layer comprises a red quantum-dot unit, a green quantum-dot unit, a transparent unit, and a white sub-pixel unit, which are arranged in sequence, and
wherein the red quantum-dot unit, the green quantum-dot unit, and the white pixel unit each are provided therein with quantum dots that are capable of producing a corresponding color light after being excited by a blue light, and the transparent unit is used for direct passing through of the blue light.

13. The liquid crystal display panel according to claim 12, wherein the quantum dots in the red quantum-dot unit and the green quantum-dot unit each are one or more types of quantum dots selected from II-VI or III-V quantum dots, and the white sub-pixel unit is made of cerium fluorescent powder.

14. The liquid crystal display panel according to claim 12, wherein the quantum dots in the quantum-dot layer are distributed uniformly in the quantum-dot layer.

15. The liquid crystal display panel according to claim 12, wherein a transparent protective layer is formed between the quantum-dot layer and the first polarizer film.

16. The liquid crystal display panel according to claim 15, wherein the transparent unit is formed from the transparent protective layer.

* * * * *